United States Patent
Wakamatsu et al.

(10) Patent No.: US 9,429,319 B2
(45) Date of Patent: Aug. 30, 2016

(54) BOILER COMBUSTION SYSTEM AND OPERATION METHOD THEREFOR

(75) Inventors: Hitoshi Wakamatsu, Kure (JP);
Takahiro Marumoto, Kure (JP);
Toshihiko Mine, Kure (JP); Pauli Dernjatin, Helsinki (FI)

(73) Assignee: MITSUBISHI HITACHI POWER SYSTEMS, LTD., Yokohama-Shi (JP)

(*) Notice: Subject to any disclaimer, the term of this patent is extended or adjusted under 35 U.S.C. 154(b) by 615 days.

(21) Appl. No.: 13/876,516

(22) PCT Filed: Oct. 12, 2011

(86) PCT No.: PCT/JP2011/005701
§ 371 (c)(1),
(2), (4) Date: Jun. 4, 2013

(87) PCT Pub. No.: WO2012/049842
PCT Pub. Date: Apr. 19, 2012

(65) Prior Publication Data
US 2013/0252184 A1    Sep. 26, 2013

(30) Foreign Application Priority Data

Oct. 15, 2010    (JP) ................................ 2010-232213

(51) Int. Cl.
*F23L 7/00*    (2006.01)
*F23C 9/08*    (2006.01)
(Continued)

(52) U.S. Cl.
CPC .................. *F23L 7/007* (2013.01); *F23C 9/00* (2013.01); *F23C 9/08* (2013.01); *F23J 15/02* (2013.01); *F23L 2900/07001* (2013.01); *Y02E 20/322* (2013.01); *Y02E 20/344* (2013.01)

(58) Field of Classification Search
CPC . F23L 7/007; F23L 2900/07001; F23C 9/08; F23C 9/00; F23J 15/02; Y02E 20/344; Y02E 20/322
USPC .......................................................... 431/12
See application file for complete search history.

(56) References Cited

U.S. PATENT DOCUMENTS 4,135,874 A * 1/1979 Tsuzi ..................... F23C 6/045
431/115
2004/0237909 A1* 12/2004 Krebs ..................... F23J 15/06
122/459
(Continued)

FOREIGN PATENT DOCUMENTS

JP    2002243110 A    8/2002
JP    2007147162 A    6/2007
(Continued)

OTHER PUBLICATIONS

International Search Report for PCT/JP2011/005701 dated Dec. 27, 2011.

*Primary Examiner* — Alfred Basichas
(74) *Attorney, Agent, or Firm* — Heslin Rothenberg Farley & Mesiti P.C.

(57) ABSTRACT

To inhibit corrosion of water wall tubes of a boiler and stabilize combustion on a burner during oxygen combustion operation, a boiler combustion system includes a boiler equipped with a burner and a two-staged combustion gas input port; a flue gas supply fan extracting flue gas from a flue gas treatment system via a flue gas circulation line; a combustion gas supply line, fuel carrier gas supply line, and two-staged combustion gas supply line branched off from the flue gas circulation line downstream of the flue gas supply fan; an oxygen supply line supplying oxygen-rich gas to the combustion gas supply line and fuel carrier gas supply line; combustion air supply fans; a switching unit switching operation between the flue gas supply fan and the combustion air supply fans; and dampers regulating gas flow rates on the combustion gas supply line and the two-staged combustion gas supply line, respectively.

5 Claims, 3 Drawing Sheets

(51) Int. Cl.
*F23C 9/00* (2006.01)
*F23J 15/02* (2006.01)

(56) References Cited

U.S. PATENT DOCUMENTS

2008/0160464 A1* 7/2008 Ghani .................... F23C 3/008
431/9

2009/0272300 A1* 11/2009 Yamada ................ F22B 35/002
110/190

FOREIGN PATENT DOCUMENTS

| | | |
|---|---|---|
| JP | 4150968 B2 | 9/2008 |
| JP | 2009270753 A | 11/2009 |
| JP | 2010107129 A | 5/2010 |
| WO | 0212791 A1 | 2/2002 |

* cited by examiner

BOILER COMBUSTION SYSTEM AND OPERATION METHOD THEREFOR

CROSS REFERENCE TO RELATED APPLICATIONS

This application is the U.S. National Filing of PCT Application No. PCT/JP2011/005701 filed on Oct. 12, 2011 and published in Japanese as WO 2012/049842 on Apr. 19, 2012, and claims priority of Japanese application JP 2010-232213 filed on Oct. 15, 2010, the entire disclosure of these applications being hereby incorporated herein by reference.

TECHNICAL FIELD

The present invention relates to a boiler combustion system and an operating method therefor, and more particularly, to a technique suitable for performing oxygen combustion operation by retrofitting an existing air-based boiler combustion system.

BACKGROUND ART

In conventional thermal power plants, air combustion systems equipped with an air combustion boiler adapted to burn fuel using air are in the mainstream. On the other hand, thermal power generation by means of an oxygen combustion system has been proposed as a method which makes it easy to recover carbon dioxide ($CO_2$) which is one of the causative substances of global warming and emitted in the largest amount in industrial activities.

In relation to the oxygen combustion system, a method has been disclosed which extracts part of flue gas from an upstream side of an FGD (Flue Gas Desulfurization) equipment after the flue gas is discharged from a boiler and subjected to dust removal, mixes the extracted flue gas with oxygen-rich gas produced by an air separator, and supplies the resulting mixed gas to the boiler together with fossil fuel such as coal (see, for example, Patent Literature 1). Since the system does not supply combustion air with a high nitrogen content to the boiler, $CO_2$ concentration in the flue gas is increased, allowing $CO_2$ to be separated efficiently from the flue gas.

On the other hand, with a coal-burning boiler which uses coal as a fuel, since sulfur oxides (hereinafter referred to as $SO_2$ for short) such as $SO_2$ is produced when a sulfur component contained in the coal is oxidized in the boiler, a large quantity of $SO_2$ is contained in the flue gas. Therefore, the $SO_2$ needs to be removed by the FGD equipment before the flue gas is released to the atmosphere, but the larger the amount of flue gas, the higher the cost for desulfurization.

In contrast, with the oxygen combustion system according to Patent Literature 1, since the flue gas extracted on the upstream side of the FGD equipment is recirculated, it is possible to reduce the amount of flue gas to be treated by the FGD equipment and thereby curb the cost for desulfurization of the flue gas. Such an oxygen combustion system can be put into operation by additionally installing an air separator, oxygen supply line, flue gas recirculation line, and the like while still using an air combustion boiler of an already-existing air combustion boiler system.

CITATION LIST

Patent Literature

Patent Literature 1: JP-A-2007-147162

SUMMARY OF INVENTION

Technical Problem

Incidentally, already-existing air combustion boilers operate two-staged combustion to decrease nitrogen oxides (hereinafter referred to as NOx for short) in the flue gas. The two-staged combustion involves supplying two-staged combustion gas input port installed in the vicinity (e.g., on a downstream side) of a combustion area of the burner with part of combustion gas supplied to the boiler and supplying the burner with oxygen at an oxygen supply ratio smaller than 1, i.e., with an amount of oxygen smaller than an amount of oxygen needed for complete combustion of the fuel, so as to cause a shortage of oxygen in the combustion area of the burner. Consequently, oxidation of nitrogen components contained in the coal is inhibited and reduction reactions of generated NOx proceed, decreasing NOx production in the combustion area.

However, when two-staged combustion is used, highly corrosive $H_2S$, COS, and the like are produced by reduction reactions of $SO_2$ in an oxygen-deficient area appearing in the combustion area of a burner zone, making water wall tubes and the like of the boiler prone to corrosion. Now, if an already-existing two-staged combustion boiler is retrofitted into an oxygen combustion system such as disclosed in Patent Literature 1, the desulfurization cost can be reduced by circulating the flue gas from the upstream side of the FGD equipment, but the $SO_2$ contained in the flue gas is concentrated by the circulation of the flue gas increasing the $SO_2$ concentration in the flue gas to 3 to 5 times the level reached during air combustion operation. Consequently, $H_2S$ and COS are increased in oxygen-deficient areas by reduction reactions of $SO_2$, accelerating corrosion of the water wall tubes and the like of the boiler due to corrosive gases.

Also, during oxygen combustion operation, since mixed gas of flue gas and oxygen is used as combustion gas, if two-staged combustion similar to that of air combustion operation is used, the amount of combustion gas supplied to the burner is 0.8 times the amount supplied during air combustion. Therefore, gas flow velocity at a combustion gas port of the burner becomes lower than during air combustion, consequently making burner flame more unstable than during air combustion.

An object of the present invention is to inhibit corrosion of water wall tubes and the like of a boiler and stabilize combustion on a burner during oxygen combustion operation of the boiler.

Solution to Problem

To solve the above problem, the present invention provides a boiler combustion system comprising: a boiler equipped with a burner adapted to burn fuel with combustion gas and a two-staged combustion gas input port adapted to supply combustion gas to a vicinity of a combustion area of the burner; a flue gas treatment system adapted to treat flue gas discharged from the boiler; a flue gas supply device installed on a flue gas circulation line and adapted to extract the flue gas from the flue gas treatment system, the flue gas circulation line being branched off from the flue gas treatment system; supply lines branching off from the flue gas circulation line on a downstream side of the flue gas supply device, including a combustion gas supply line adapted to supply combustion gas to the burner, a fuel carrier gas supply line adapted to supply fuel carrier gas used to transport the fuel to the burner, and a two-staged combustion gas supply line adapted to supply gas to the two-staged combustion gas input port; an oxygen supply line adapted to supply oxygen-rich gas to the combustion gas supply line and the fuel carrier gas supply line via respective flow regulators; a combustion air supply device installed parallel to the flue gas supply device and adapted to supply combustion air; switching means adapted to switch operation between the flue gas supply device and the combustion air supply device; and flow regulating devices adapted to regulate gas flow rates on the combustion gas supply line and the two-staged combustion gas supply line, respectively.

Consequently, as the switching means is operated, the combustion air supply device comes into operation, causing air combustion operation to be performed with combustion air being supplied to the boiler or the flue gas supply device comes into operation, causing oxygen combustion operation to be performed with mixed gas of flue gas and oxygen-rich gas being supplied to the boiler. In this way, since an operation mode of the boiler can be switched freely between air combustion operation and oxygen combustion operation, the system can be operated by taking the environment and power generation loads into consideration.

Also, since the flow regulating devices allow the gas flow rates on the combustion gas supply line and two-staged combustion gas supply line to be regulated freely, it is possible to perform control such that for example, during air combustion operation, two-staged combustion will be carried out by supplying combustion air at an oxygen supply ratio smaller than 1 to the boiler and that during oxygen combustion operation, mixed combustion gas of flue gas and oxygen-rich gas will be supplied only to the burner. Also, during oxygen combustion operation, by supplying combustion gas only to the burner, for example, combustion gas corresponding to the combustion air supplied to the two-staged combustion gas input port during air combustion operation can be diverted to the burner. This increases flow velocity of the combustion gas supplied through the burner, making it possible to stabilize combustion on the burner. Also, if the oxygen supply ratio of the combustion gas supplied through the burner is adjusted to be 1 or above during oxygen combustion operation, it is possible to prevent oxygen-deficient areas from appearing in a combustion area of the burner, thereby inhibit generation of corrosive gases, and thereby inhibit corrosion of water wall tubes and the like of the boiler.

In this case, the combustion air supply device may comprise a first air supply fan adapted to supply the combustion air to the flue gas circulation line on the downstream side of the flue gas supply device and a second air supply fan adapted to supply the combustion air to the fuel carrier gas supply line branching off from the flue gas circulation line. If respective combustion air destinations are taken care of separately by plural air supply fans in this way, it becomes easy to adjust supplied amounts of combustion air.

Also, the present invention provides a boiler combustion system comprising: a boiler equipped with a burner adapted to burn fuel with combustion gas and a two-staged combustion gas input port adapted to supply combustion gas to a vicinity of a combustion area of the burner; a flue gas treatment system adapted to treat flue gas discharged from the boiler; first and second flue gas supply devices installed on first and second flue gas circulation lines, respectively, and adapted to extract the flue gas from the flue gas treatment system, the first and second flue gas circulation lines being branched off from the flue gas treatment system; supply lines branching off from a downstream side of the first flue gas supply device, including a combustion gas supply line adapted to supply combustion gas to the burner and a two-staged combustion gas supply line adapted to supply gas to the two-staged combustion gas input port; a fuel carrier gas supply line communicated with a downstream side of the second flue gas supply device and adapted to supply fuel carrier gas used to transport the fuel to the burner; an oxygen supply line adapted to supply oxygen-rich gas to the combustion gas supply line and the fuel carrier gas supply line via respective flow regulators; first and second combustion air supply devices installed parallel to the first and second flue gas supply devices, respectively, and adapted to supply combustion air; switching means adapted to switch operation between the first and second flue gas supply devices and the first and second combustion air supply devices; and flow regulating devices adapted to regulate gas flow rates on the combustion gas supply line and the two-staged combustion gas supply line, respectively.

Also, the present invention provides an operating method for a boiler combustion system, the operating method comprising: operating two-staged combustion by supplying combustion air to the burner and the two-staged combustion gas input port when the boiler is operated in the air combustion mode where a supplied amount of the combustion air supplied to the burner is larger than a supplied amount of the combustion air supplied through the two-staged combustion gas input port and advisably an oxygen supply ratio of the combustion air supplied to the burner is between 0.7 and 0.9 (both inclusive); and supplying mixed gas only to the burner when the boiler is operated in the oxygen combustion mode, the mixed gas being made by mixing oxygen-rich gas with part of flue gas discharged from the boiler where advisably an oxygen supply ratio of the mixed gas is between 1.0 and 1.2 (both inclusive).

Incidentally, during oxygen combustion operation, if single-staged combustion which involves supplying combustion gas only through the burner is carried out, the two-staged combustion gas input port is exposed to high-temperature gas of approximately 1000° C. or above, and consequently might get burnt out. Therefore, when the boiler is operated in the oxygen combustion mode, the mixed gas is supplied through the burner and flue gas smaller in amount than the mixed gas is supplied through the two-staged combustion gas input port. This keeps the two-staged combustion gas input port from becoming too hot, making it possible to inhibit burnout.

Advantageous Effects of Invention

The present invention can inhibit corrosion of water wall tubes and the like of a boiler and stabilize combustion on a burner during oxygen combustion operation of the boiler. This allows maintenance cost of the boiler to be reduced and enables long-term stable operation.

DESCRIPTION OF EMBODIMENTS

Figure 1:
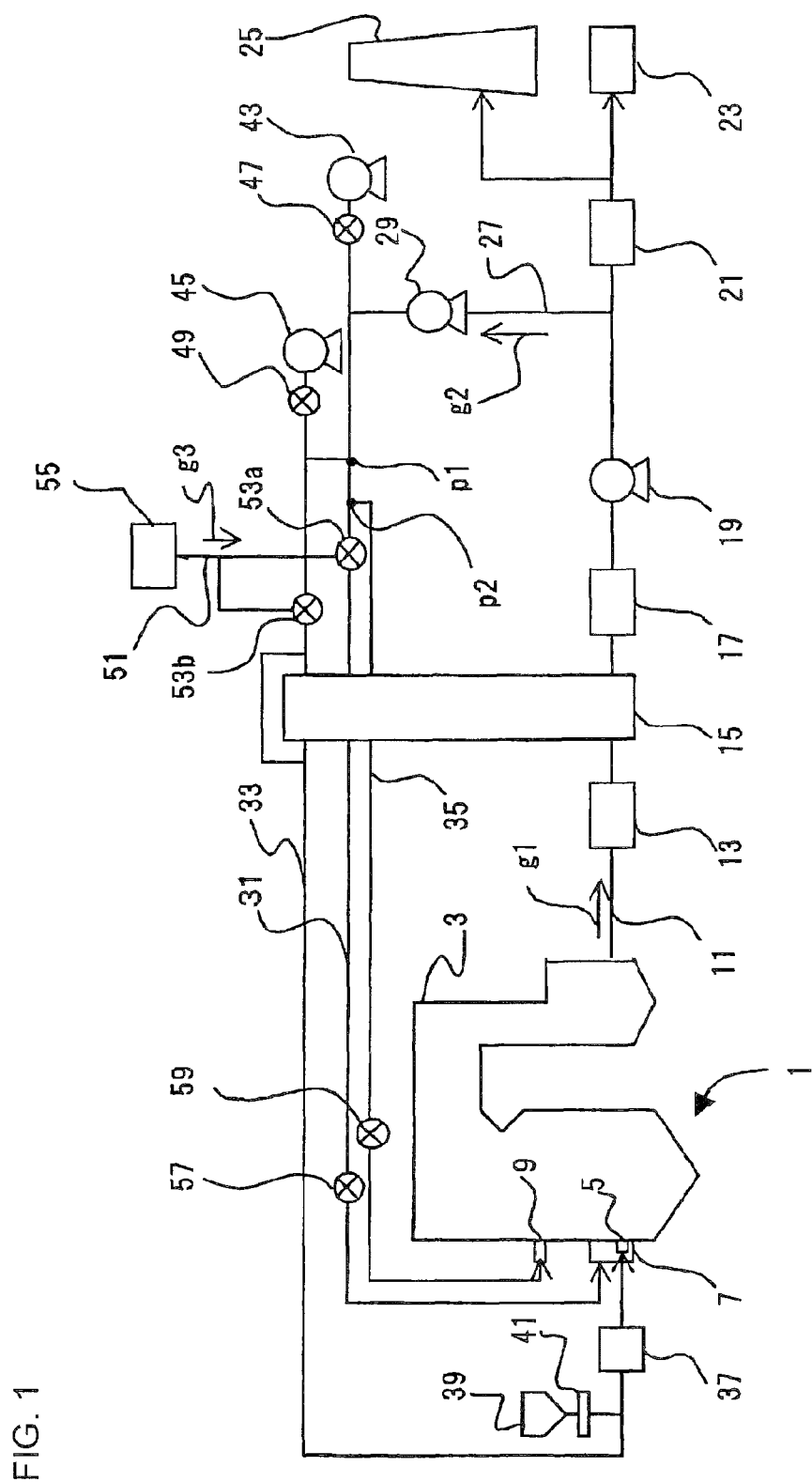
FIG. 1 is a system diagram showing a configuration of an embodiment of a boiler combustion system resulting from application of the present invention.

An embodiment of an oxygen combustion system resulting from application of the present invention will be described in detail below with reference to FIG. 1. A boiler combustion system shown in FIG. 1 can be constructed by adding equipment needed for oxygen combustion and thereby changing the configuration and system based on an already-existing air combustion system, and can switch combustion mode of the boiler between an air combustion mode and oxygen combustion mode. It should be noted that although in the present embodiment, pulverized coal is described as an example of fossil fuel burned in the boiler, the present invention is not limited, for example, to fossil fuels and that other fuels such as biomass fuel may be used.

The boiler 1 includes a furnace 3, a burner 5 and wind box 7 mounted in the furnace 3, and a two-staged combustion gas input port 9 installed downstream of a combustion area of the burner 5. The burner 5 is contained in the wind box 7. A fuel channel through which pulverized coal is supplied as fuel and combustion gas channel through which combustion gas is supplied are formed in the burner 5.

A flue gas treatment line 11 through which flue gas g1 runs is connected to an outlet of the boiler 1. A denitrification equipment 13, a heat exchanger 15, a dust remover 17, an induced draft fan 19, an FGD equipment 21, and a $CO_2$ recovery device 23 are disposed in order on the flue gas treatment line 11 starting from the upstream side. Midway between the FGD equipment 21 and $CO_2$ recovery device 23, the flue gas treatment line 11 is branched and connected at the far end to a stack 25.

A flue gas circulation line 27 branches off from the flue gas treatment line 11 midway between the induced draft fan 19 and FGD equipment 21. A flue gas supply fan 29 adapted to extract part of the flue gas (hereinafter referred to as circulating flue gas g2) from the flue gas treatment line 11 is installed on the flue gas circulation line 27. On a downstream side of the flue gas supply fan 29, the flue gas circulation line 27 branches into three lines: namely, a combustion gas supply line 31, fuel carrier gas supply line 33, and two-staged combustion gas supply line 35. Specifically, the flue gas circulation line 27 branches into the combustion gas supply line 31 and fuel carrier gas supply line 33 at a branch point p1, and then the two-staged combustion gas supply line 35 further branches off from the combustion gas supply line 31 at a branch point p2. The combustion gas supply line 31 is connected to the combustion gas channel of the burner 5 via the heat exchanger 15. The fuel carrier gas supply line 33 is connected to the fuel channel of the burner 5 by passing through the heat exchanger 15 and a coal pulverizer 37 in sequence. The two-staged combustion gas supply line 35 is connected to the two-staged combustion gas input port 9 of the boiler 1 via the heat exchanger 15. Incidentally, the fuel carrier gas supply line 33 is structured to be able to bypass the heat exchanger 15.

Fuel coal is stored in a bunker 39, and when a feeder 41 opens, coal is supplied to the coal pulverizer 37 via the fuel carrier gas supply line 33 and pulverized to a particle size suitable for pulverized coal firing by a coal mill or the like (not shown) contained in the coal pulverizer 37. The pulverized coal is designed to be supplied to the fuel channel of the burner 5 by being accompanied by the combustion gas supplied through the fuel carrier gas supply line 33.

On the downstream side of the flue gas supply fan 29, a first combustion air supply fan 43 adapted to supply combustion air is connected to the flue gas circulation line 27 in parallel with the flue gas supply fan 29. Also, a second combustion air supply fan 45 is connected, in parallel with the flue gas supply fan 29, to the fuel carrier gas supply line 33 branched off from the flue gas circulation line 27. Here, the first combustion air supply fan 43 is designed to supply combustion air flow-regulated by a damper 47 mainly to the combustion gas supply line 31 and two-staged combustion gas supply line 35 while the second combustion air supply fan 45 is designed to supply combustion air flow-regulated by a damper 49 mainly to the fuel carrier gas supply line 33.

On the downstream side of the branch point p2, the combustion gas supply line 31 and fuel carrier gas supply line 33 are connected with outlets of branches from an oxygen supply line 51 via flow regulating valves 53a and 53b, respectively. On the other hand, an inlet portion of the oxygen supply line 51 on an opposite side is connected with an oxygen supply device 55 adapted to produce oxygen-rich gas. Consequently, the oxygen-rich gas produced by the oxygen supply device 55 is designed to be divided and supplied to both the combustion gas supply line 31 and fuel carrier gas supply line 33. The oxygen-rich gas is mixed with the circulating flue gas flowing through the combustion gas supply line 31 and fuel carrier gas supply line 33 and valve openings of the flow regulating valves 53a and 53b are adjusted to provide a practical oxygen concentration (e.g., 26 to 29% wet vol: wet-basis volume percentage). Incidentally, the oxygen supply device 55 according to the present embodiment produces high-concentration oxygen gas with a concentration of 95% dry vol (dry-basis volume percentage) or above by separating nitrogen and the like from air, but this is not restrictive.

Respective gas flow measuring devices (not shown) employing an orifice or the like are disposed on the combustion gas supply line 31 and two-staged combustion gas supply line 35, and respective dampers 57 and 59 are installed on the downstream side of the heat exchanger 15. Detected values of gas flow rates measured by the gas flow measuring devices on the two supply lines are inputted to a controller (not shown), which then controls the openings of the dampers 57 and 59 such that the measured gas flow rates will be equal to set gas flow rates. Also, the controller has a switching function to switch operation between the flue gas supply fan 29 and the first and second combustion air supply fans 43 and 45. For example, when a command to switch from oxygen combustion operation to air combustion operation is entered in control means, the flue gas supply fan 29 stops operating and the first combustion air supply fan 43 and second combustion air supply fan 45 start operating. Conversely, when a command to switch from air combustion operation to oxygen combustion operation is entered in control means, the first combustion air supply fan 43 and second combustion air supply fan 45 stop operating and the flue gas supply fan 29 starts operating.

When the boiler 1 is in air combustion operation, the present system carries out two-staged combustion by operating the first combustion air supply fan 43 and second combustion air supply fan 45 and thereby supplying combustion air to the burner 5 and two-staged combustion gas input port 9. Here, the two-staged combustion means a combustion mode which achieves complete combustion of fuel using a combination of combustion air supplied to the burner 5 at an oxygen supply ratio of less than 1.0 and oxygen of combustion air supplied to the two-staged combustion gas input port 9. Consequently, an oxygen-deficient area is formed in the combustion area of the burner 5, inhibiting oxidation reactions of nitrogen components contained in the fuel, and reduction reactions of NOx proceed downstream of the combustion area of the burner 5. This decreases an amount of NOx emissions.

During air combustion operation, the boiler 1 is supplied with combustion air and pulverized coal and burns the pulverized coal. The flue gas produced when the pulverized coal is burned in the boiler 1 is led to the flue gas treatment line 11 and then supplied to the denitrification equipment 13, which then removes NOx from the flue gas. After leaving the denitrification equipment 13, the flue gas is supplied to the heat exchanger 15 and subjected there to a temperature decrease. After leaving the heat exchanger 15, the flue gas is led to the dust remover 17, which then removes dust and/or soot components from the flue gas. Subsequently, the flue gas is led to the FGD equipment 21 via the induced draft fan 19 and subjected there to SOx removal. After leaving the FGD equipment 21, the flue gas is cooled and compressed by the $CO_2$ recovery device 23. Consequently, $CO_2$ is separated in a liquefied state. On the other hand, gaseous components remaining after the $CO_2$ is separated are released to the atmosphere through a stack 25. Incidentally, during air combustion operation, since the flue gas supply fan 29 is stopped, the flue gas is not led to the boiler 1 through the flue gas circulation line 27.

On the other hand, the combustion air blown out by the second combustion air supply fan 45 is subjected to flow regulation by the damper 49 and then supplied mainly to the fuel carrier gas supply line 33. The combustion air flowing through the fuel carrier gas supply line 33 is heat-exchanged by the heat exchanger 15, further heated to a predetermined temperature after merging with part of combustion air bypassing the heat exchanger 15, then introduced into the coal pulverizer 37, and supplied to the burner 5 in accompaniment with pulverized coal supplied from coal mill. The combustion air blown out by the first combustion air supply fan 43 is subjected to flow regulation by the damper 47 and then divided and supplied mainly to the combustion gas supply line 31 and two-staged combustion gas supply line 35. The combustion air divided to the combustion gas supply line 31 and two-staged combustion gas supply line 35 and heated by the heat exchanger 15. Then gas flow rate of the combustion air is measured by the flow measuring devices installed on the two supply lines and the openings of the dampers 57 and 59 are adjusted such that the detected gas flow rate will match a predetermined gas flow rate. Here, the oxygen supply ratios of the combustion air supplied to the burner 5 and two-staged combustion gas input port 9 are adjusted to set values by the openings of the dampers 47, 57, and 59. A supplied amount of the combustion air supplied to the two-staged combustion gas input port 9 is adjusted to a set amount smaller than a supplied amount of combustion air supplied to the burner 5. In this way, the boiler 1 carries out two-staged combustion using combustion air with the supplied amounts and oxygen supply ratios of the combustion air adjusted to set ranges.

Next, the operation of switching the operation mode of the boiler 1 from air combustion mode to oxygen combustion mode will be described. When a command to switch from air combustion mode to oxygen combustion mode is entered in the controller, the controller stops operation of the first combustion air supply fan 43 and second combustion air supply fan 45 and starts operation of the flue gas supply fan 29. Also, on commands from the controller, the oxygen supply device 55 starts operating, the damper 57 is opened, and the damper 59 is closed. Consequently, the circulating flue gas g2 supplied from the flue gas circulation line 27 passes only through the combustion gas supply line 31 and fuel carrier gas supply line 33, both of which are then supplied with oxygen-rich gas g3. Then, the circulating flue gas g2 is supplied to the burner 5 for single-staged combustion. On commands from the controller, a supplied amount of the oxygen-rich gas g3 is controlled to match a set amount through adjustment of the openings of the flow regulating valves 53a and 53b while the oxygen supply ratio of the combustion gas supplied to the burner 5 through the combustion gas supply line 31 is adjusted to a set value of 1.0 or above through adjustment of the opening of the damper 57. Here, the single-staged combustion means a combustion mode which stoichiometrically ensures complete combustion of fuel solely using the oxygen supplied through the burner 5 by setting the oxygen supply ratio of the combustion air supplied to the burner 5 at 1.0 or above.

To switch from two-staged combustion to single-staged combustion or vice versa in this way, if Q denotes a total flow rate of the combustion gas flowing through the combustion gas supply line 31 and two-staged combustion gas supply line 35, the amounts of the combustion gas supplied to the combustion gas supply line 31 and two-staged combustion gas supply line 35 are controlled by adjusting the openings of the dampers 57 and 59 with Q kept constant. That is, to switch from two-staged combustion to single-staged combustion, action is taken to supply the combustion gas supplied so far to the two-staged combustion gas supply line 35 to the combustion gas supply line 31 by closing the damper 59 and opening the damper 57. On the other hand, to switch from single-staged combustion to two-staged combustion, action is taken to supply part of the combustion gas supplied so far only to the combustion gas supply line 31 to the two-staged combustion gas supply line 35 by opening the damper 59 and slightly closing the damper 57.

Incidentally, during oxygen combustion operation, since mixed gas of the circulating flue gas g2 and oxygen-rich gas g3 is used as combustion gas, the gas composition in the boiler 1 principally includes $CO_2$. On the other hand, during air combustion operation which involves the use of combustion air as combustion gas, since the gas composition in the boiler 1 principally includes nitrogen, an amount of heat absorption in the boiler 1 and boiler outlet temperature differ from those during oxygen combustion operation. Therefore, a system which operates both in oxygen combustion mode and air combustion mode requires a means of setting the amount of heat absorption and boiler outlet temperature during oxygen combustion operation equal to those during air combustion operation.

To achieve this, it is necessary to increase the oxygen concentration in the combustion gas from 21% wet vol, which is used in regular air combustion mode, to 25% to 30% wet vol and increase the amount of combustion gas supplied to the boiler 1 to approximately 80% the amount used during air combustion operation. However, if it is assumed that the same two-staged combustion as during air combustion operation is used, since the amount of combustion gas supplied to the boiler 1 is decreased to approximately 80%, the flow velocity of the combustion gas ejected from the burner 5 to the boiler 1 falls, decreasing flame stability of the burner 5.

Also, during oxygen combustion operation, the $SO_2$ contained in the circulating flue gas g2 is concentrated by the circulation of the flue gas, increasing the $SO_2$ concentration in the circulating flue gas g2 to 3 to 5 times the level reached during air combustion operation. Therefore, two-staged combustion, if carried out during oxygen combustion operation, accelerates reduction reactions, i.e., generation of corrosive gases such as $H_2S$ and COS from $SO_2$, in the oxygen-deficient area formed in the combustion area of the burner 5 faster than during air combustion operation, accelerating corrosion of the water wall tubes and the like of the boiler due to the corrosive gases.

Figure 2:
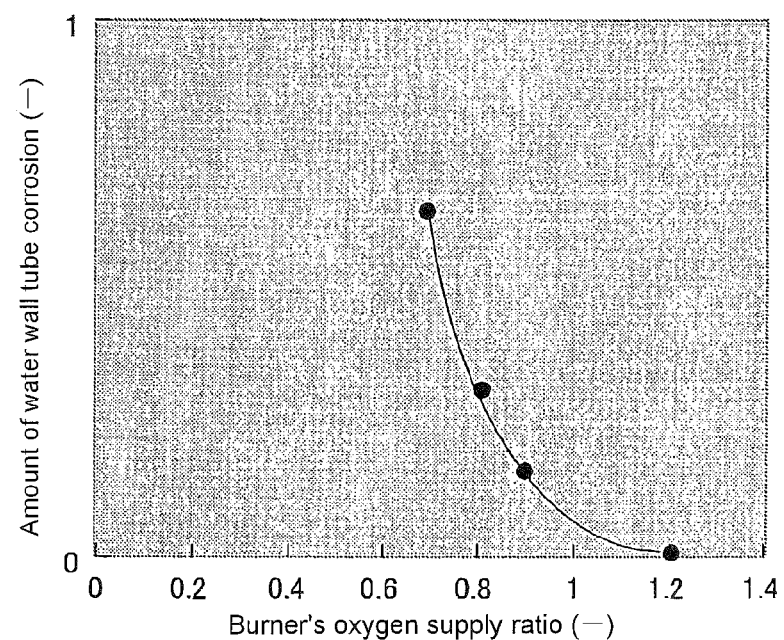
FIG. 2 is a diagram illustrating a relationship between a burner's oxygen supply ratio and an amount of water wall tube corrosion in the boiler combustion system resulting from application of the present invention.

FIG. 2 shows a relationship between the oxygen supply ratio of the combustion gas supplied to the burner 5 (hereinafter referred to as the burner's oxygen supply ratio for short) and the amount of boiler water wall tube corrosion. As shown in FIG. 2, operation using two-staged combustion, in which the burner's oxygen supply ratio is less than 1, increases the amount of boiler water wall tube corrosion.

To inhibit the corrosion, the present embodiment uses single-staged combustion, in which the burner's oxygen supply ratio is 1 or above, for oxygen combustion operation. When the burner's oxygen supply ratio is set to 1 or above, the fuel burns completely with the necessary amount of oxygen being supplied to the burner 5. This makes it possible to prevent formation of an oxygen-deficient area in the combustion area of the burner 5 and thereby inhibit corrosion of the boiler's water wall tubes. Also, since the present embodiment uses single-staged combustion rather than two-staged combustion for oxygen combustion operation, the combustion gas otherwise inputted to the two-staged combustion gas input port 9 can be inputted to the burner 5. This makes it possible to increase the amount of combustion gas supplied to the burner 5 and accordingly increase the flow velocity of the combustion gas ejected from the burner 5.

Specifically, in two-staged combustion during air combustion operation, 50% to 85% of the total amount of combustion gas is supplied to the burner 5, and the rest is supplied to the two-staged combustion gas input port 9. Therefore, since that part of combustion gas which is supplied to the two-staged combustion gas input port 9 is supplied to the burner 5 for single-staged combustion during oxygen combustion operation, 1.2 times or above as much combustion gas as supplied during two-staged combustion can be supplied to the burner 5. Consequently, gas flow velocity of the combustion gas ejected from a combustion gas port of the burner 5 during oxygen combustion can be set equal to the gas flow velocity used during air combustion, making it possible to maintain flame stability.

Incidentally, when single-staged combustion is used for oxygen combustion operation, it is feared that an amount of NOx generated in the boiler 1 might increase. However, since oxygen combustion operation involves recirculating the flue gas, the amount of NOx discharged outside a recirculation system is smaller than during air combustion operation.

Figure 3:
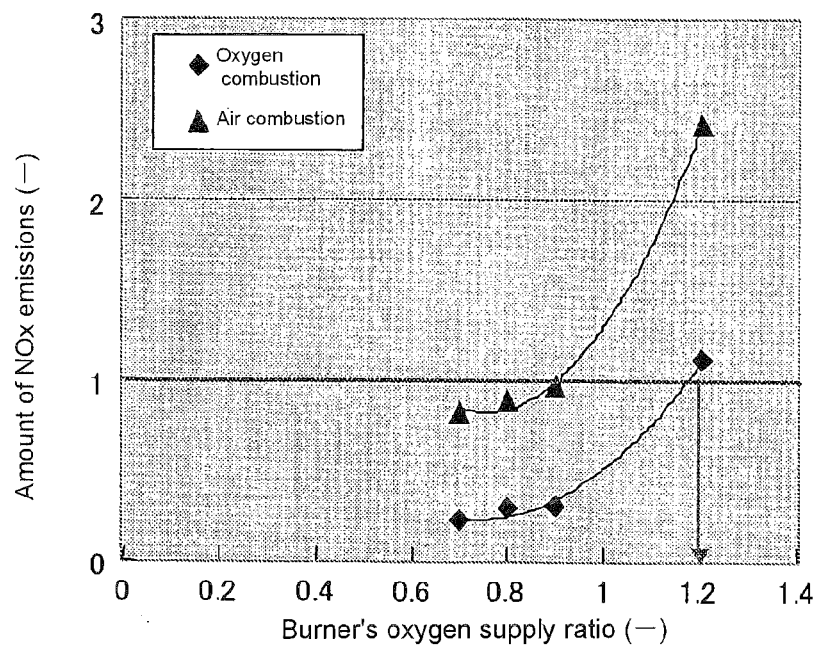
FIG. 3 is a diagram illustrating a relationship between a burner's oxygen supply ratio and an amount of NOx emissions in the boiler combustion system resulting from application of the present invention.

FIG. 3 shows a relationship between a burner's oxygen supply ratio and an amount of NOx emissions from a stack. In regular air combustion operation, the burner's oxygen supply ratio set to 1.1 to 1.3 to burn the fuel completely by supplying an excessive amount of oxygen, and the burner's oxygen supply ratio is set to 1.0 or less during two-staged combustion. On the other hand, in the case of oxygen combustion operation, the amount of NOx emissions produced by single-staged combustion (burner's oxygen supply ratio=1.2) is equivalent to the amount produced by two-staged combustion (burner's oxygen supply ratio=0.8 to 0.9) in air combustion operation. Therefore, the oxygen combustion operation using single-staged combustion can keep down the amount of NOx emissions to a level equivalent to that of air combustion operation using two-staged combustion.

Regarding operation conditions for oxygen combustion operation, if the burner's oxygen supply ratio is set to 1.2 or above, manufacturing cost of the oxygen-rich gas supplied from the oxygen supply device 55 increases, and thus it is desirable to use single-staged combustion with a burner's oxygen supply ratio of 1.2 or less. On the other hand, if the burner's oxygen supply ratio is set to less than 1.0, the $SO_2$ concentration in the flue gas becomes 3 to 5 times the level reached during air combustion operation, increasing the amount of corrosive gases generated in the oxygen-deficient area in the combustion area of the burner 5 and thereby accelerating corrosion of the boiler's water wall tubes. Therefore, desirably single-staged combustion is carried out with the burner's oxygen supply ratio set between 1.0 and 1.2 (both inclusive).

Furthermore, when oxygen combustion operation is performed using single-staged combustion, the two-staged combustion gas input port 9 is exposed to a high-temperature gas of, for example, 1000° C. or above, and consequently metal members of the two-staged combustion gas input port 9 might be burnt out. Therefore, during oxygen combustion operation, preferably the circulating flue gas g2 (e.g., flue gas with an oxygen concentration of 4% or below) supplied from the flue gas supply fan 29 is inputted in the two-staged combustion gas input port 9 by opening the damper 59 slightly. By allowing the circulating flue gas g2 to flow in this way, increases in the temperature of the two-staged combustion gas input port 9 can be curbed, making it possible to prevent burnout.

Regarding operation conditions for air combustion operation, to achieve the effects of inhibiting oxidation of nitrogen components during combustion and facilitating reduction of NOx, desirably two-staged combustion is used with a burner's oxygen supply ratio of 0.9 or below. Here, if the burner's oxygen supply ratio is set to less than 0.7, the amount of generation of corrosive gases in the oxygen-deficient area is increased, accelerating corrosion of the water wall tubes and the like of the boiler. Therefore, desirably two-staged combustion is carried out with the burner's oxygen supply ratio set between 0.7 and 0.9 (both inclusive). Incidentally, proportions of gas supplies through the burner 5 and two-staged combustion gas input port 9 (proportions of gas flow along the combustion gas supply line 31 and two-staged combustion gas supply line 35) are adjusted, for example, such that the proportion of the gas supplied through the two-staged combustion gas input port 9 will be smaller than the proportion of the gas supplied through the burner 5, for example, with the gas flow to the burner 5 making up 50% to 75% and the gas flow to the two-staged combustion gas input port 9 making up 25% to 50%.

As described above, according to the present embodiment, since the operation mode of the boiler 1 can be switched easily and freely between air combustion operation and oxygen combustion operation, the system can be operated by taking the environment and power generation loads into consideration. Also, even when the operation mode is switched from air combustion operation to oxygen combustion operation, it is possible to inhibit corrosion of the water wall tubes of the boiler 1 from progressing and maintain high flame holding performance of the burner 5. This allows maintenance cost of the boiler 1 to be reduced and enables long-term stable operation.

Incidentally, although in the present embodiment, an example has been described in which the dampers 47, 57, and 59 and the like are used as flow regulating devices for the combustion air flowing through the combustion gas supply line 31 and two-staged combustion gas supply line 35, for example, during air combustion operation, the present invention is not limited to this as long as the gas flow rates can be adjusted. Also, although in the present embodiment, an example has been described in which atmospheric air obtained by operating the first combustion air supply fan 43 and second combustion air supply fan 45 is used as combustion air during air combustion operation, the present invention is not limited to this, and some other gas at least more than about 21% of which is made up of oxygen may be used alternatively.

Figure 4:
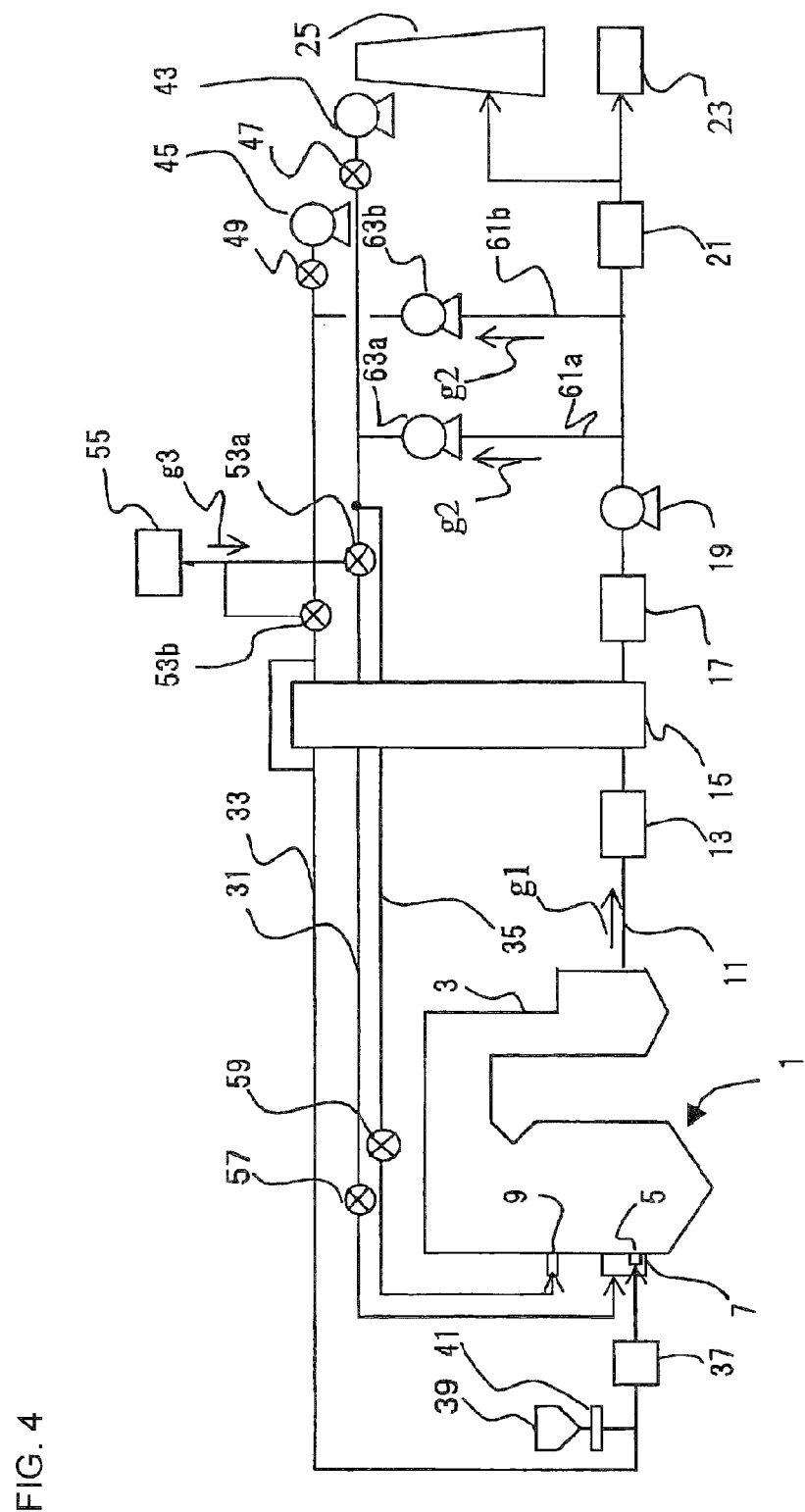
FIG. 4 is a system diagram showing a configuration of another embodiment of a boiler combustion system resulting from application of the present invention.

Also, although in the present embodiment, an example has been described in which part of flue gas is extracted by connecting one end of the flue gas circulation line 27 to the flue gas treatment line 11 between the induced draft fan 19 and FGD equipment 21, the present invention is not limited to this as long as the flue gas circulation line 27 is connected at least to the downstream side of the dust remover 17 installed on the flue gas treatment line 11. Also, the number of flue gas circulation lines 27 is not limited to one. For example, as shown in FIG. 4, two flue gas circulation lines 61a and 61b may be installed with the flue gas circulation line 61a being connected to the combustion gas supply line 31 and the flue gas circulation line 61b being connected to the fuel carrier gas supply line 33. In that case, it is assumed that flue gas supply fans 63a and 63b are installed in the flue gas circulation lines 61a and 61b, respectively.

The invention claimed is:

1. A boiler combustion system comprising:
   a boiler equipped with a burner configured to burn fuel with combustion gas and a two-staged combustion gas input port configured to supply combustion gas to a neighborhood of a combustion area of the burner;
   a flue gas treatment system configured to treat flue gas discharged from the boiler;
   a flue gas supply device configured to supply the flue gas extracted from the flue gas treatment system to the boiler;
   supply lines configured to supply the flue gas supplied from the flue gas supply device, including a combustion gas supply line configured to supply the flue gas as the combustion gas to the burner, a fuel carrier gas supply line configured to supply the flue gas as fuel carrier gas used to transport the fuel to the burner, and a two-staged combustion gas supply line configured to supply the flue gas as two-staged combustion gas to the two-staged combustion gas input port;
   an oxygen supply device configured to produce oxygen-rich gas and supply the oxygen-rich gas to the combustion gas supply line and the fuel carrier gas supply line via respective flow regulators;
   a combustion air supply device configured to supply combustion air to each of the combustion gas supply line, the fuel carrier gas supply line, and the two-staged combustion gas supply line;
   a first damper configured to regulate a flow rate of gas supplied from the combustion gas supply line to the burner;
   a second damper configured to regulate a flow rate of gas supplied from the two-staged combustion gas supply line to the two-staged combustion gas input port; and
   a control unit configured to control openings of the first damper and the second damper, switching operation between the flue gas supply device and the combustion air supply device, and start of operation of the oxygen supply device, wherein
   when switching from oxygen combustion mode to air combustion mode the control unit performs control so as to switch from operation of the flue gas supply device to operation of the combustion air supply device and change the second damper from closed to open with the first damper kept open, and when switching from air combustion mode to oxygen combustion mode, the control unit performs control so as to switch from operation of the combustion air supply device to operation of the flue gas supply device, start operating the oxygen supply device, and change the second damper from open to closed with the first damper kept open.

2. The boiler combustion system according to claim 1, wherein the combustion air supply device comprises a first air supply fan configured to supply the combustion air to the combustion gas supply line and the two-staged combustion gas supply line, and a second air supply fan configured to supply the combustion air to the fuel carrier gas supply line.

3. A boiler combustion system comprising:
   a boiler equipped with a burner configured to burn fuel with combustion gas and a two-staged combustion gas input port configured to supply combustion gas to a neighborhood of a combustion area of the burner;
   a flue gas treatment system configured to treat flue gas discharged from the boiler;
   first and second flue gas supply devices configured to each supply the flue gas extracted from the flue gas treatment system to the boiler;
   supply lines configured to supply the flue gas supplied from the first flue gas supply device, including a combustion gas supply line configured to supply the flue gas as combustion gas to the burner and a two-staged combustion gas supply line configured to supply the flue gas as two-staged combustion gas to the two-staged combustion gas input port;
   a fuel carrier gas supply line configured to supply the flue gas as fuel carrier gas used to transport the fuel to the burner, the flue gas being supplied from the second flue gas supply device;
   an oxygen supply device configured to produce oxygen-rich gas and supply the oxygen-rich gas to the combustion gas supply line and the fuel carrier gas supply line via respective flow regulators;
   a first combustion air supply device configured to supply combustion air to the combustion gas supply line and the two-staged combustion gas supply line;
   a second combustion air supply device configured to supply combustion air to the fuel carrier gas supply line;
   a first damper configured to regulate a flow rate of gas supplied from the combustion gas supply line to the burner;
   a second damper configured to regulate a flow rate of gas supplied from the two-staged combustion gas supply line to the two-staged combustion gas input port; and
   a control unit configured to control openings of the first damper and the second damper, switching operation between the first and the second flue gas supply devices and the first and the second combustion air supply devices, and start of operation of the oxygen supply device, wherein
   when switching from oxygen combustion mode to air combustion mode, the control unit performs control so as to switch from operation of the first and second flue gas supply devices to operation of the first and second combustion air supply devices and yet open the first damper and the second damper, and when switching from air combustion mode to oxygen combustion mode, the control unit performs control so as to switch from operation of the first and second combustion air supply devices to operation of the first and second flue gas supply devices, start operating the oxygen supply device, and yet close the second damper with the first damper kept open.

4. An operating method for a boiler combustion system which comprises a boiler equipped with a burner adapted to burn fuel with combustion gas and a two-staged combustion gas input port adapted to supply combustion gas to a vicinity of a combustion area of the burner, and which is configured to be able to switch combustion mode of the boiler between an air combustion mode and oxygen combustion mode, the operating method comprising:

carrying out two-staged combustion by supplying combustion air to the burner and the two-staged combustion gas input port when the boiler is operated in the air combustion mode where a supplied amount of the combustion air supplied to the burner is larger than a supplied amount of the combustion air supplied through the two-staged combustion gas input port and an oxygen supply ratio of the combustion air supplied to the burner is between and including 0.7 and 0.9; and supplying mixed gas only to the burner when the boiler is operated in the oxygen combustion mode, the mixed gas being made by mixing oxygen-rich gas with part of flue gas discharged from the boiler where an oxygen supply ratio of the mixed gas is between and including 1.0 and 1.2.

5. The operating method for a boiler combustion system according to claim 4, wherein when the boiler is operated in the oxygen combustion mode, the mixed gas is supplied through the burner and flue gas smaller in amount than the mixed gas is supplied through the two-staged combustion gas input port.

* * * * *